United States Patent
Mossoba et al.

(10) Patent No.: US 10,121,355 B1
(45) Date of Patent: Nov. 6, 2018

(54) CONDITION-RESPONSIVE WEARABLE DEVICE FOR SENSING AND INDICATING PROXIMITY OF AN ARTICLE WITH A SPECIFIC CHARACTERISTIC

(71) Applicant: Capital One Services, LLC, McLean, VA (US)

(72) Inventors: Michael Bakr Mossoba, Arlington, VA (US); Salik Shah, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/019,130

(22) Filed: Jun. 26, 2018

(51) Int. Cl.
| | |
|---|---|
| G08B 21/24 | (2006.01) |
| G08B 21/02 | (2006.01) |
| G06F 17/30 | (2006.01) |
| G06K 9/00 | (2006.01) |
| G06F 1/16 | (2006.01) |

(52) U.S. Cl.
CPC ............ *G08B 21/24* (2013.01); *G06F 1/163* (2013.01); *G06F 17/3028* (2013.01); *G06K 9/00671* (2013.01); *G08B 21/02* (2013.01)

(58) Field of Classification Search
CPC ..... G08B 21/02; G06F 17/3028; G06F 1/163; G06K 9/00671
See application file for complete search history.

(56) References Cited

U.S. PATENT DOCUMENTS

| | | |
|---|---|---|
| 7,158,030 B2 | 1/2007 | Chung |
| 8,179,257 B2 | 5/2012 | Allen, Jr. et al. |
| 9,740,906 B2 * | 8/2017 | Alnasser ............ G06K 7/10009 |
| 9,870,058 B2 * | 1/2018 | McCoy .................... G06F 3/017 |
| 2004/0103043 A1 | 5/2004 | Reade et al. |
| 2006/0005441 A1 * | 1/2006 | Riley ..................... B42D 15/00 40/633 |
| 2008/0218335 A1 | 9/2008 | Attar |
| 2009/0265381 A1 | 10/2009 | Canu et al. |
| 2012/0028577 A1 | 2/2012 | Rodriguez et al. |
| 2012/0293323 A1 * | 11/2012 | Kaib .................... G06F 19/3418 340/539.12 |
| 2016/0189039 A1 * | 6/2016 | Leppanen ................ G06N 5/04 706/11 |
| 2017/0300926 A1 * | 10/2017 | Stout ...................... G06Q 30/02 |

* cited by examiner

*Primary Examiner* — Mohamed Barakat
(74) *Attorney, Agent, or Firm* — Finnegan, Henderson, Farabow, Garrett & Dunner, LLP

(57) ABSTRACT

A condition-responsive wearable device for sensing and indicating proximity of an article with a specific characteristic includes a processor and a sensor. The sensor is configured to detect an article with two or more information sources within a predetermined distance of the sensor. The information sources contain characteristic information of the article. The wearable device also includes a memory storing instructions that, when executed by the processor, cause the processor to receive predefined characteristic information, select detected characteristic information from at least two of the information sources to compare with the predefined characteristic information, and compare the selected detected characteristic information with the predefined characteristic information. The wearable device includes an indicator configured to generate an alarm in response to detecting a match between the selected detected characteristic information and the predefined characteristic information.

20 Claims, 6 Drawing Sheets

CONDITION-RESPONSIVE WEARABLE DEVICE FOR SENSING AND INDICATING PROXIMITY OF AN ARTICLE WITH A SPECIFIC CHARACTERISTIC

TECHNICAL FIELD

The present disclosure provides systems and methods for sensing and indicating proximity of an article with a specific characteristic. In particular, in some embodiments, the system for sensing and indicating proximity of an article with a specific characteristic may include condition-responsive wearable device.

BACKGROUND

Humans may want to avoid or limit their exposure to certain articles. In this context, an article may be, for example, a food product, a medication, or other substance with a specific characteristic. In some cases, a person may suffer from an adverse reaction when they are in the presence of the article or they consume it. For example, a child may have an allergy to food products containing peanuts and suffer from itching in the presence of peanut butter. In another example, patients may feel ill if they unintentionally medicate with an incorrect medicine containing a drug or ingredient not suitable for the patient. In other cases, a person may want to avoid an article for nutritional or religious purposes. For example, an athlete may want to avoid consuming food products high in saturated fats in order to maintain their athletic performance level. A practitioner of a religion forbidding consumption of a particular animal may want to avoid consuming food products containing that animal. Thus, humans may want to avoid various articles for multiple reasons. It is therefore desirable to provide means by which a person can be informed about an article the person wants to avoid. Current systems, however, are limited in the type and/or number of technologies they use to inform a person about an article the person wants to avoid. Current systems also are limited in their ability to decide which piece of information about an article to rely on when informing a person about the article. It is desirable to improve the accuracy with which current systems detect the presence of articles of interest.

In view of the shortcomings of current systems and methods, improved systems and methods for providing the same are desired.

SUMMARY

Consistent with disclosed embodiments, there is provided a wearable device for sensing and indicating proximity of an article with a specific characteristic comprising a processor and a sensor. The sensor is configured to detect an article with two or more information sources within a predetermined distance of the sensor, the information sources containing characteristic information of the article. The sensor is configured to detect the characteristic information from at least one of the information sources. The wearable device also comprises a memory storing instructions that, when executed by the processor, cause the processor to receive predefined characteristic information, select detected characteristic information from at least two of the information sources to compare with the predefined characteristic information, and compare the selected detected characteristic information with the predefined characteristic information. The wearable device further comprises an indicator configured to generate an alarm in response to the processor detecting a match between the selected detected characteristic information and the predefined characteristic information.

Consistent with disclosed embodiments, there is also provided a wearable device for sensing and indicating proximity of an information source associated with an article with a specific characteristic comprising a processor and two or more sensors of different types. Each sensor is configured to detect one or more information sources associated with an article within a predetermined distance of the sensor, wherein the information sources contain characteristic information of the article, and detect the characteristic information from at least one of the information sources. The wearable device also comprises a memory storing instructions that, when executed by the processor, cause the processor to receive predefined characteristic information, select detected characteristic information from at least two of the information sources to compare with the predefined characteristic information, and compare the selected detected characteristic information with the predefined characteristic information. The wearable device further comprises an indicator configured to generate an alarm in response to the processor detecting a match between the selected detected characteristic information and the predefined characteristic information.

Consistent with disclosed embodiments, there is also provided a non-transitory computer-readable medium storing a set of instructions that are executed by at least one processor to perform a method for sensing and indicating proximity of an article with a specific characteristic. The method comprises receiving characteristic information of an article detected by a sensor from at least one information source. At least two information sources contain characteristic information of the article. The method further comprises receiving predefined characteristic information and selecting detected characteristic information from at least two of the information sources to compare with the predefined characteristic information. The method further comprises comparing the selected detected characteristic information with the predefined characteristic information and detecting a match between the selected detected characteristic information and the predefined characteristic information.

Consistent with disclosed embodiments, there is also provided a wearable device for sensing and indicating proximity of an article with a specific characteristic, the wearable device comprising a processor and a sensor. The sensor is configured to detect an article with a first information source within a first predetermined distance of the sensor, the first information source including characteristic information of the article. The sensor is configured to detect the characteristic information of the article from the first information source. The sensor is configured to detect a user with a second information source within a second predetermined distance of the sensor, the second information source including characteristic information of the user. The sensor is configured to detect the characteristic information of the user from the second information source. The wearable device also comprises a memory storing instructions that, when executed by the processor, cause the processor to request predefined characteristic information associated with the user based on the detected characteristic information of the user, receive the predefined characteristic information, and compare the characteristic information of the article with the predefined characteristic information. The wearable device also comprises an indicator configured to generate an alarm in response to the processor detecting a mismatch between the characteristic information of the article and the predefined characteristic information.

Consistent with disclosed embodiments, there is also provided a wearable device for sensing and indicating proximity of an information source associated with an article with a specific characteristic, the wearable device comprising a processor and two or more sensors of different types. Each sensor is configured to detect one or more first information sources associated with an article within a first predetermined distance of the sensor, the one or more first information sources including characteristic information of the article. Each sensor is configured to detect the characteristic information of the article from the one or more first information sources. The wearable device also comprises a memory storing instructions that, when executed by the processor, cause the processor to receive characteristic information of a user, request predefined characteristic information associated with the user based on the received characteristic information of the user, receive the predefined characteristic, select detected characteristic information of the article from at least two of the information sources to compare with the predefined characteristic information, and compare the selected detected characteristic information with the predefined characteristic information. The wearable device also comprises an indicator configured to generate an alarm in response to the processor detecting a mismatch between the selected detected characteristic information and the predefined characteristic information.

Consistent with disclosed embodiments, there is also provided a non-transitory computer-readable medium storing a set of instructions that are executed by at least one processor to perform a method for sensing and indicating proximity of an article with a specific characteristic. The method comprises receiving characteristic information of an article detected by at least one sensor on a wearable device from at least one first information source; receiving characteristic information of a user detected by at least one sensor on a wearable device from at least one second information source; requesting predefined characteristic information associated with the user based on the received characteristic information of the user; receiving the predefined characteristic information; comparing the characteristic information of the article with the predefined characteristic information; and detecting a mismatch between the characteristic information of the article and the predefined characteristic information.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

As described in further detail herein, exemplary embodiments disclosed herein are directed to systems and methods for sensing and indicating proximity of an article with a specific characteristic. In this context, an article may be, for example, a food product, a medication, or other substance with a specific characteristic. A specific characteristic may be a characteristic that the wearable device's user wants to avoid, such as the characteristic of containing an ingredient, containing too much of a nutritional component, having too high a price, not meeting religious requirements, or not medically prescribed. For example, a person may have allergies, nutritional goals, and religious reasons for avoiding various food products and/or ingredients. The characteristic may be predefined (i.e., the specified or specific characteristic). For example, the user may select or input the characteristic they want to avoid before using the wearable device, in order to avoid an article with the selected or inputted characteristic.

In some embodiments, the system may include a wearable device. The wearable device may be an electronic device that can be worn on a user's body as an accessory or an implant. The wearable device may receive voice commands and/or transmit and receive RF signals to/from other devices. The wearable device may provide haptic, auditory, and/or visual notifications, or "alarms," to the device's user.

Reference will now be made in detail to exemplary embodiments, examples of which are illustrated in the accompanying drawings and disclosed herein.

Wherever convenient, the same reference numbers will be used throughout the drawings to refer to the same or like parts.

Figure 1:
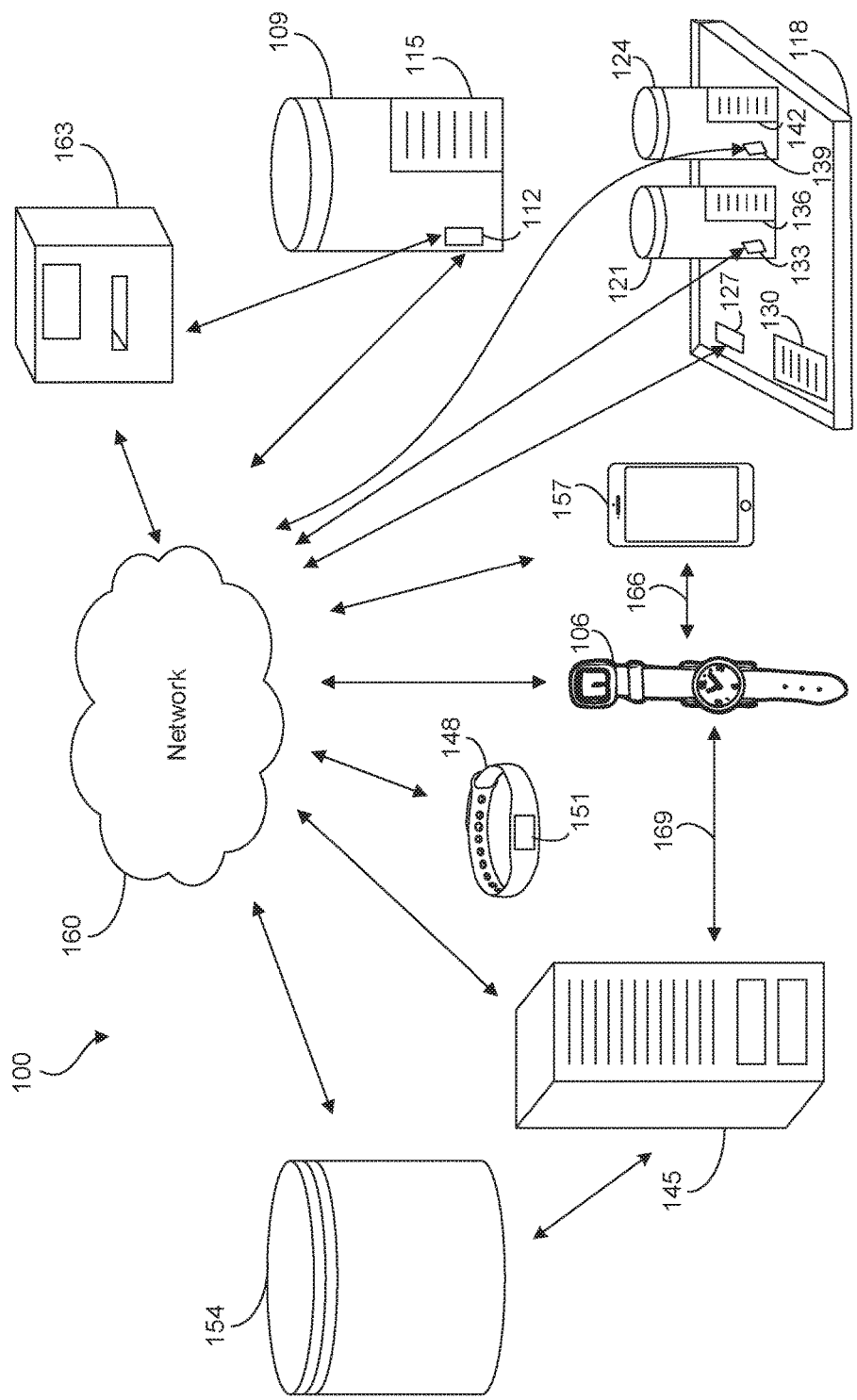
FIG. 1 is a diagram of a system environment within which an exemplary system for sensing and indicating proximity of an article with a specific characteristic may operate.

FIG. 1 is a diagram of an exemplary system environment 100 within which an exemplary wearable device 106 may operate. Wearable device 106 is configured to sense and indicate proximity of an exemplary article 109 having one or more specific characteristics. Wearable device 106 may be, for example, a smartwatch, smart glasses, smart clothing, or another type of wearable device.

In some embodiments, article 109 may be a food product or a container therefor. Article 109 may be a medicine or a container therefor. More generally, article 109 may be anything a user may come in contact with and/or consume. Article 109 may include one or more information sources, such as one or more radio-frequency Identification (RFID) tag 112, a label 115, a Quick Response ("QR") code, barcode, or a physical shape that may be associated with article 109 and be detectable by wearable device 106. As known in the art, a QR code is a type of matrix barcode. Wearable device 106 may detect article 109 and/or one or more of the information sources associated therewith. The information source(s) may be affixed to article 109, contained within article 109, or otherwise associated with article 109. In some embodiments, the information source(s) may be affixed to a shelf or other structure holding article 109. The information source(s) may contain characteristic information associated with article 109. RFID tag 112 may contain, for example, ingredient information. Upon detecting the information source, wearable device 106 may also detect the characteristic information contained by the information source. A descriptive product label 115 may be affixed to article 109. Label 115 may contain content, such a written or printed content. For example, label 115 may include an ingredient list. The text on label 115 may be processed using optical character recognition to determine the content on label 115. This may be done, for example, to detect the ingredients in article 109 (i.e., the characteristic information). Article 109 may have a physical shape detected by wearable device 106 and processed to detect characteristic information associated with article 109. For example, article 109 may have the shape of a soda bottle. Wearable device 106 may detect the physical shape (i.e., the information source) and use the physical shape to detect that article 109 is a bottle of soda (i.e., the characteristic information). In some embodiments, wearable device 106 may use multiple sensors, discussed below with respect to FIG. 2, to detect one or more information sources associated with article 109.

In some embodiments, wearable device 106 may detect article 109 if article 109 is within a predetermined distance of wearable device 106. For example, wearable device 106 may detect article 109 when article 109 is within about one foot of wearable device 106. In some embodiments, wearable device 106 may detect article 109 when article 109 is within less than about one foot from wearable device 106 (e.g., when the user is holding article 109) and/or more than about one foot from wearable device 106. In some embodiments, wearable device 106 may detect article 109 when article 109 is within a detectable distance for RFID communication. Thus, wearable device 106 may sense the proximity of article 109.

In some embodiments, wearable device 106 may be configured to sense and indicate proximity of an exemplary article 118 and/or included sub-articles 121 and 124. For example, article 118 may be a tray, and sub-article 121 may be a medicine bottle and sub-article 124 may be a jar of food, both on the tray. Like article 109, article 118 may have one or more information source(s) affixed to, contained within, or otherwise associated with it. In some embodiments, the information source(s) may be affixed to a shelf or other structure holding article 118. The information sources may contain characteristic information. This characteristic information may be associated with sub-article 121, sub-article 124, or both. The information sources may be an RFID tag 127, a label 130, and/or the physical shape of article 118. Sub-article 121 and sub-article 124 may be of the same type (e.g., both food products) or of two different types (e.g., one a food product and the other a medicine). In some embodiments, sub-article 121 and/or sub-article 124 may have no information source affixed to, contained within, or otherwise associated with them. In such case, characteristic information about sub-article 121 and/or sub-article 124 may be included in the information source affixed to article 118. In some embodiments, sub-article 121 and/or sub-article 124 may have at least one information source affixed to, contained within, or otherwise associated with them. For example, sub-article 121 may have RFID 133 and label 136 affixed thereto and sub-article 124 may have RFID 139 and label 142 affixed thereto.

Wearable device 106 may detect characteristic information from one or more information sources associated with an article, e.g., article 109 or article 118. If wearable device 106 detects different characteristic information from multiple information sources associated with an article, wearable device 106 may select which detected characteristic information to compare with predefined characteristic information. In some embodiments, system environment 100 includes a server 145, which may be a local or remote server. Wearable device 106 may transmit different detected characteristic information to server 145 and server 145 may select which detected characteristic information to compare. For example, server 145 may select particular detected characteristic information based on expected reliability of the information. Server 145 may transmit the result of the comparison to wearable device 106.

Wearable device 106 may receive predefined characteristic information. Predefined characteristic information is information with which characteristic information is compared to determine whether to generate an alarm for the user. In this sense, wearable device 106 may be considered a condition-responsive wearable device. Predefined characteristic information may include, for example, one or more ingredients to which the user is allergic, a medicine that the user should or should not receive (e.g., a prescription), a number of calories the user should not consume, a quantity of a nutritional component the user should not consume (e.g., cholesterol), meeting or not meeting a religious requirement (e.g., kosher for Passover), or a price a user should not exceed or pay to remain within a budget. In some embodiments, the predefined characteristic information may be associated with someone other than the user instead of or in addition to being associated with the user of wearable device 106. The predefined information may be static or dynamic. In the case of dynamic predefined information, the predefined information may be updated based on the user's actions. For example, if the user indicates they have consumed a number of calories, the predefined information indicating the number of calories the user should not consume for the remainder of the day may be updated. In another example, if a user or the user's healthcare provider indicates that the user has a new medical prescription, the predefined information indicating an identifier of the prescribed medicine and/or its dosage may be updated.

Wearable device 106 is configured to generate an alarm if there is a match or mismatch between the predefined characteristic information and the detected characteristic information. For example, wearable device 106 may generate an alarm if a detected ingredient of a food product matches an ingredient to which the user is allergic. In some embodiments, wearable device 106 may generate an alarm if a detected medicine does not match a medicine prescribed to a patient. In some embodiments, wearable device 106 may generate an alarm if a detected food product has more calories than the user indicated they want to consume for the rest of the day.

In some embodiments, exemplary system environment 100 may include a wristband 148 that may be detected by wearable device 106. Wristband 148 may have an information source such as RFID tag 151. Wearable device 106 may detect multiple objects with information sources, such as article 109 and wristband 148. Wearable device 106 may detect characteristic information from information sources affixed to, contained in, or otherwise associated with article 109 and wristband 148. Wearable device 106 may use the characteristic information associated with wristband 148 to request predefined characteristic information associated with wristband 148 or its user and compare the predefined characteristic information with characteristic information associated with article 109. For example, wristband 148 may be worn by a patient or student, the characteristic information associated with wristband 148 may be an identifier of the patient or student, article 109 may be a medicine or food product, the characteristic information associated with article 109 may be an identifier of the medicine or food product, and the predefined characteristic information may be an identifier of a medicine prescribed to the patient or an allergy list for the student. In some embodiments, wearable device 106 may transmit the characteristic information to server 145, and server 145 may retrieve the predefined characteristic information (e.g., from database 154) and perform the comparison between the characteristic information and the predefined characteristic information. Server 145 may send the results of the comparison to wearable device 106 or another device (e.g., a device for monitoring the proximity of the user wearing wearable device 106 to an article the user should avoid).

Wearable device 106 may be capable of communicating with another device similar to wearable device 106 or another type of device. For example, wearable device 106 may communicate with an external smartphone 157, a server 145, or other computing system. Inter-device communication may be effectuated using RFID, Bluetooth, Near-Field Communication (NFC), WiFi Direct, or any other suitable communication technologies. In the case of a digital watch, wearable device 106 may receive, for example, time-zone information from the user's smartphone 157 with Global Position System capabilities.

Wearable device 106 may include technologies, such as various hardware and software components, to transmit and receive RF signals. Wearable device 106 may be able to transmit or receive data over a network 160. Network 160 may be implemented as, for example, the Internet, a wired Wide Area Network (WAN), a wired Local Area Network (LAN), a wireless LAN (e.g., Institute of Electrical and Electronics Engineers (IEEE) 802.11, Bluetooth, etc.), a wireless WAN (e.g., Worldwide Interoperability for Microwave Access (WiMAX)), a public switched telephone network (PSTN), an Integrated Services Digital Network (ISDN), an infrared (IR) link, a radio link, such as a Universal Mobile Telecommunications System (UMTS), Global System for Mobile Communications (GSM), Code Division Multiple Access (CDMA), broadcast radio network, cable television network, a satellite link, or the like. Network 160, in some embodiments, may include a plurality of interconnected wired or wireless data networks that receive data from one device (e.g., wearable device 106) and send it to another device (e.g., smartphone 157 or server 145). In the case of a smart-glasses device, wearable device 106 may connect to, for example, a cellular network to transmit phone-call data.

Wearable device 106 may provide notifications and alerts and may receive inputs from a user to allow the user to interact with wearable device 106. For example, a user may turn wearable device 106 on or off by by issuing voice commands to wearable device 106, interacting with a touchscreen of wearable device 106, or pressing a button on wearable device 106. In some embodiments, a user may use another device, such as smartphone 157, to interact with wearable device 106.

Wearable device 106 may communicate with server 145 directly or over network 160. Server 145 may store, for example, the above-described predefined characteristic information. Server 145 may receive a request, for example, from wearable device 106 to transmit predefined characteristic information. Server 145 may initiate transmission of predefined characteristic information, such as the requested predefined characteristic information to wearable device 106.

In some embodiments, exemplary system environment 100 may include a database 154. Database 154 may store, for example, predefined characteristics for one or more users of wearable device 106 and/or other devices. Server 145 may communicate with database 154 directly or over network 160. Server 145 may retrieve predefined characteristic information from database 154 and initiate transmission of the predefined characteristic information to wearable device 106. In some embodiments, server 145 may initiate transmission of the predefined characteristic information directly from database 154 to wearable device 106.

In some embodiments, wearable device 106 may detect article 109 and initiate transmission of information associated with article 109, such as information identifying article 109, to server 145. Server 145 may retrieve characteristic information associated with article 109. The characteristic information may be stored in server 145, database 154, or other memory. The characteristic information may be stored in association with an identifier for article 109. In an embodiment, wearable device 106 may detect article 109 by detecting RFID 112. Wearable device 106 may detect information identifying article 109, such as a Universal Product Code (UPC), by reading RFID tag 112 or another information source (e.g., a QR code). Wearable device 106 may initiate transmission of the UPC to server 145. Server 145 may then look up characteristic information for article 109, such as the ingredients within article 109.

Exemplary system environment 100 may include an RFID writer 163. RFID writer 163 may be configured to write characteristic information to RFID tags described with respect to system environment 100. RFID tags may be passive or active. Passive RFID tags may be powered by an RFID sensor (e.g., RFID reader) on wearable device 106 or by another device. RFID tags may be read-only or read/write tags.

Components in system environment 100 may communicate bi-directionally with other components in system environment 100 either through network 160 or through one or more direct-communication links, such as a wireless communication link 166 between wearable device 106 and smartphone 157, and/or communication link 169 between wearable device 106 and server 145. In some embodiments, wireless communication link 166 and/or a wireless communication link 169 may include a direct-communication network, including, for example, Bluetooth, Wi-Fi, NFC, or other suitable communication methods that provide a medium for transmitting data between separate devices.

For ease of discussion, FIG. 1 depicts only particular components being connected to network 160. In some embodiments, however, more or fewer components may be connected to network 160.

Figure 2:
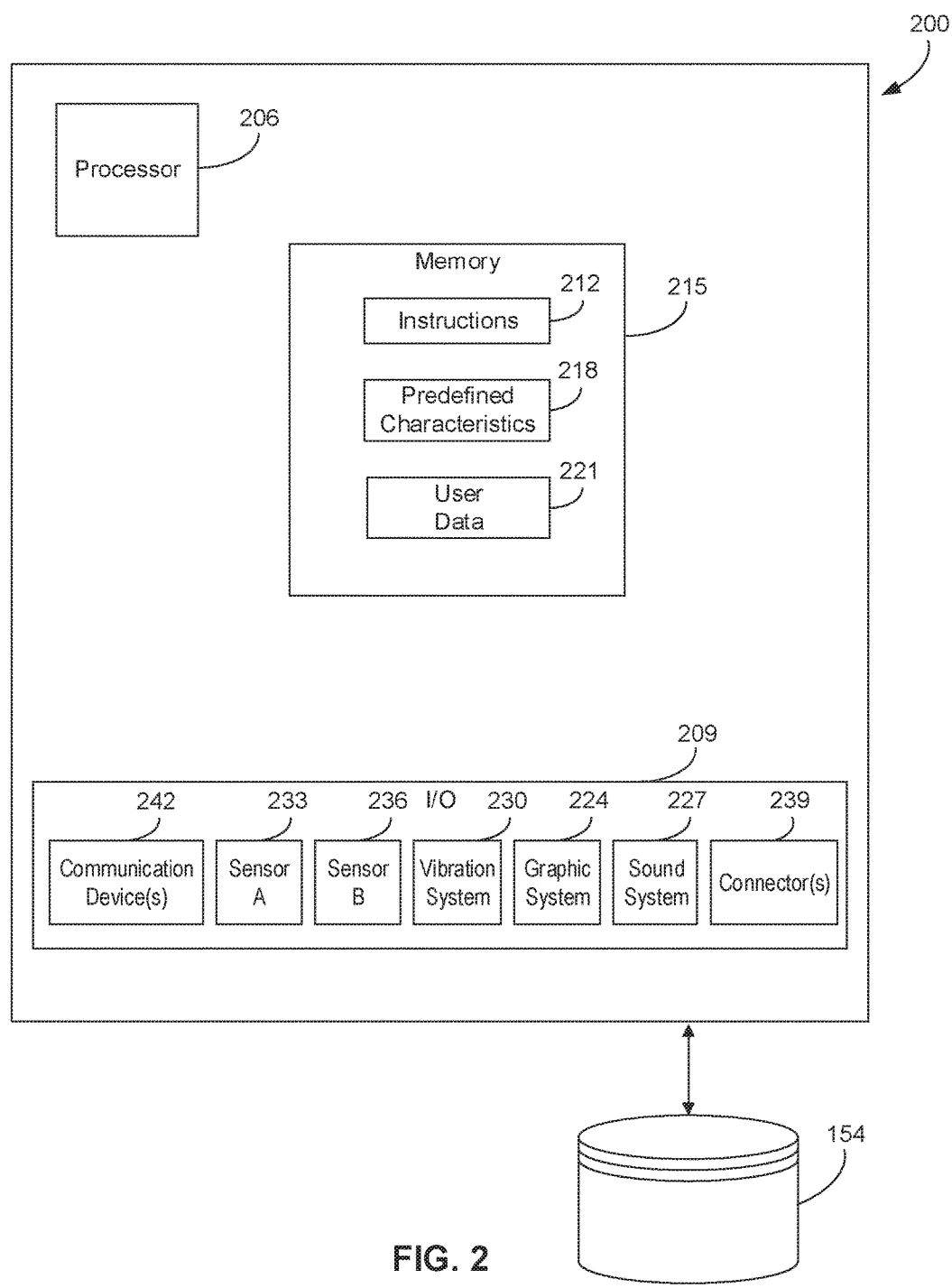
FIG. 2 is a diagram of an exemplary computing system configuration that may, in some embodiments, implement the exemplary system for sensing and indicating proximity of an article with a specific characteristic of FIG. 1.

FIG. 2 is a diagram of an exemplary configuration of a computing system 200 that may, in some embodiments, implement wearable device 106 described above with respect to FIG. 1. Computing system 200 includes one or more processors 206, one or more Input/Output components ("I/O components 209"), and one or more memories 215. Computing system 200 may be standalone, or may be part of a subsystem, which may be part of a larger system. Computing system 200 may be in communication with external database 154, described above with respect to FIG. 1.

Processor 206 may constitute a single-core or multiple-core (e.g., dual or quad core) processor that may execute parallel processes simultaneously. For example, processor 206 may be configured with virtual-processing technologies such as logical processors or other known technologies to simultaneously execute, control, run, manipulate, store, etc., multiple software processes, applications, programs, etc. One of ordinary skill in the art would understand that other types of processor arrangements could be implemented that provide for the capabilities disclosed herein. In some embodiments, processor 206 may be a microcontroller. Processor 206 may receive the above-described predefined characteristic information, e.g., one or more ingredients to which the user is allergic, a medicine or dosage thereof that the user should or should not receive (e.g., a prescription), a number of calories the user should not consume, a quantity of a nutritional component the user should not consume (e.g., cholesterol), meeting or not meeting a religious requirement (e.g., kosher for Passover), or a price a user should not exceed or pay to remain within a budget. In some embodiments, processor 206 may select detected characteristic information from two or more information sources of the type previously described, e.g., radio-frequency Identification (RFID) tag 112, a label 115, a Quick Response ("QR") code, barcode, or a physical shape, for comparing to the predefined characteristic information. For example, processor 206 may determine which characteristic information may be more reliable or accurate when determining which characteristic information to select. For example, processor 206 may consider characteristic information obtained by an RFID reader more reliable than information obtained by a camera. In this case, processor 206 may select the characteristic information obtained by the RFID sensor. In some embodiments, processor 206 may compare detected characteristic information with predefined characteristic information. Processor 206 may initiate the generation of an alarm with an indicator, discussed below with respect to I/O components 209, in response to detecting a match or a mismatch between detected characteristic information and predefined characteristic information.

Memory 215 may contain instructions 212. Processor 206 may execute instructions 212 to analyze predefined characteristics 218, described above with respect to FIG. 1, and/or user data 221 to perform operations consistent with disclosed embodiments. Predefined characteristics 218 may be entered by the user or received from another source. User data 221 may include information related to logistics of the operation of wearable device 106, such as auto-shutdown settings and alarm intensity. User data 221 may include a user's MP3 files, photographs, financial account information, username and password, home or work locations, credit or debit card PIN, biometric information, credit scores, financial transaction history, retail transaction history, user location data for past financial or retail transactions, financial-data breach alerts, birthdate, or fitness-tracking data. In some embodiments, computing system 200 may receive data from server 145 via network 160 (FIG. 1) and store the data in memory 215 as user data 221. In some embodiments, computing system 200 may create one or more user profiles that are stored as user data 221 and/or predefined characteristics 218.

I/O components 209 may include one or more graphics systems 224 such as individual LEDs, LED arrays, liquid crystal displays, dot matrix displays, or other types of displays. I/O components 209 may include a sound system 227 such as a speaker and/or a microphone. I/O components 209 may include a vibration system 230 such as a vibration motor or haptic system. Any of these systems may be an indicator that generates an alarm in response to a component of wearable device 106 or another system (e.g., server 145) detecting a match or mismatch between detected characteristic information and predefined characteristic information. The alarm could be a sound, a vibration, or a display produced by wearable device 106. In some embodiments, instead or in addition, the alarm could be generated in response to another result, such as if a value specified by the characteristic information exceeds a value specified by the predefined characteristic information. For example, if wearable device 106 or another system (e.g., server 145) detects that the number of calories in an article (i.e., the characteristic information) exceeds the maximum number of calories identified by the predefined characteristic information, an alarm may be generated.

I/O components 209 may include a sensor A 233 and/or a sensor B 236. Wearable device 106 may employ one or more sensors, such as sensor A 233 and sensor B 236, to detect an article and/or an information source. Sensor A 233 or sensor B 236 may be an imaging device (i.e., a device that captures an image). Sensor A 233 or sensor B 236 may be any combination of a QR code reader, a barcode reader, a camera, or a RFID reader. Sensor A 233 or sensor B 236 may detect characteristic information from an information source. For example, if sensor A 233 is an RFID reader, it may read an information source, e.g., RFID tag 112, to detect characteristic information associated with article 109, e.g., ingredients in article 109. If sensor A 233 is a camera, it may capture an image of ingredients listed on label 115 on article 209. Sensor A 233 may be a barcode reader. Wearable device 106 may transmit read barcode information to server 145 for server 145 to retrieve and/or transmit predefined characteristic information or characteristic information. Sensor B 236 may be the same or a different type of sensor than sensor A 233. In some embodiments, if wearable device 106 detects more than one piece of characteristic information with the same or multiple sensors, wearable device 106 may choose whether to rely on all detected characteristic information or some detected characteristic information.

I/O components 209 may include one or more connectors 239 for connecting, by wire or wirelessly, to one or more input devices, such as keyboards, mouse devices, and the like, which may enable computing system 200 to receive input from an operator of wearable device 106. I/O components 209 may include touch sensors, dome switches, buttons, or piezoelectric sensors.

I/O components 209 may also include one or more communication devices 242 configured to receive and/or transmit data at and from computing system 200. Communication devices 242 may include one or more digital and/or analog communication devices that allow computing system 200 to communicate with other machines and devices, such as other components of system environment 100 shown in FIG. 1. For example, in some embodiments, communication devices 242 may include network adapters providing communication with network 160 (FIG. 1). In some embodiments, communication devices 242 may include wireless-communication devices (e.g., an antenna). Communication devices 242 may provide wireless communication link 166 and/or wireless communication link 169 (FIG. 1). In some embodiments, communication devices 242 may be configured to receive user data 221 or real-time information from smartphone 157 and/or server 145 (FIG. 1). In some embodiments, such real-time information may include location information of smartphone 157, weather information, traffic information, map data, social-networking data, crime reports, news, air-traffic-control data, police data, medical-emergency data, and fire-service data. In some embodiments, real-time information may also include data captured by a sensor on smartphone 157, such as images, video, biometric authentication data (for example, finger print scan data and facial scan data), temperature data, speed data, and wind speed data. Characteristic information associated with article 109 detected by sensor A 233 and/or sensor B 236 may be transmitted to server 145 to compare with information stored in database 154 to identify article 109. In some embodiments, the characteristic information may be compared with information stored on wearable device 106. This comparison may be performed using, for example, a standard image-comparison algorithm or software package.

Memory 215 may include one or more storage devices configured to store software instructions 212, which, when executed by processor 206, cause processor 206 to perform operations consistent with the disclosed embodiments. The disclosed embodiments are not limited to separate programs or computers configured to perform dedicated tasks. Processor 206 may execute one or more instructions located remotely from computing system 200. For example, processor 206 may further execute one or more instructions located in database 154, a cloud server, or another server located outside of computing system 200 (e.g., server 145 in FIG. 1). The instructions may include server applications, an authentication application, network communication processes, and other types of application or software. Memory 215 may be a volatile or non-volatile, magnetic, semiconductor, tape, optical, removable, non-removable, or other type of storage device or tangible (i.e., non-transitory) computer-readable medium.

Figure 3:
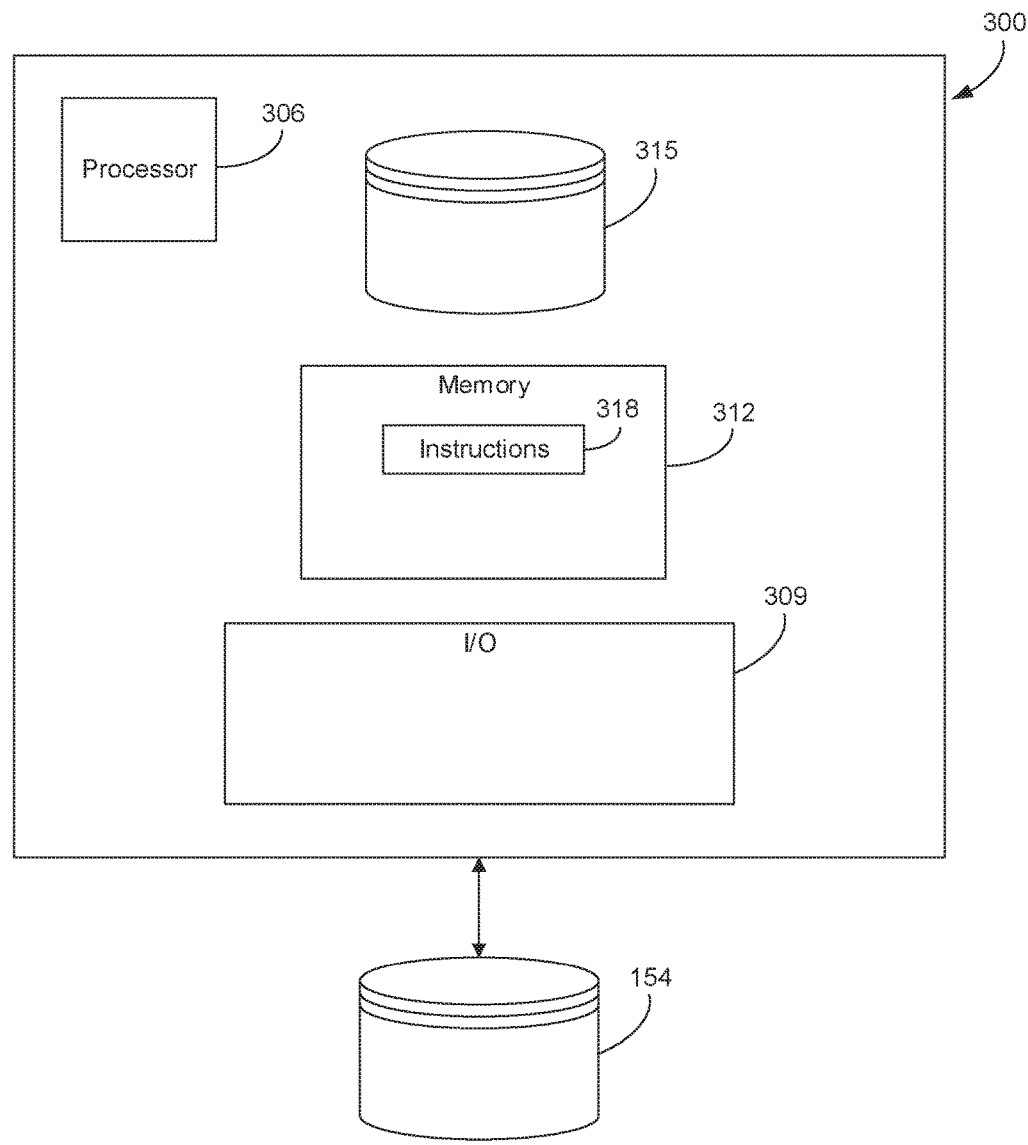
FIG. 3 is a diagram of an exemplary computing system configuration that may, in some embodiments, implement an exemplary server of FIG. 1.

FIG. 3 is a diagram of an exemplary configuration of computing system 300 that may, in some embodiments, implement server 145 described above with respect to FIG. 1. Computing system 300 includes one or more processors 306, one or more Input/Output components ("I/O components 309"), and one or more memories 312. Computing system 300 may be standalone, or may be part of a subsystem, which may be part of a larger system. Computing system 300 may be in communication with external database 154. Computing system may include an internal database 315.

Processor 306 may constitute a single-core or multiple-core (e.g., dual or quad core) processor that may execute parallel processes simultaneously. For example, processor 306 may be configured with virtual-processing technologies such as logical processors or other known technologies to simultaneously execute, control, run, manipulate, store, etc., multiple software processes, applications, programs, etc. One of ordinary skill in the art would understand that other types of processor arrangements could be implemented that provide for the capabilities disclosed herein. In some embodiments, processor 306 may be a microcontroller. Processor 306 may perform one or more functions described with respect to processor 206 (FIG. 2). Instead or in addition, processor 306 may receive a request for predefined characteristic information and initiate transmission of the predefined characteristic information.

I/O components 309 may include one or more components described with respect to I/O components 209 (FIG. 2).

Memory 312 may include one or more storage devices configured to store software instructions 318, which, when executed by processor 306, cause processor 306 to perform operations consistent with the disclosed embodiments. The disclosed embodiments are not limited to separate programs or computers configured to perform dedicated tasks. Processor 306 may execute one or more instructions located remotely from computing system 300. For example, processor 306 may further execute one or more instructions located in database 154, a cloud server, or another server (e.g., server 145 in FIG. 1) located outside of computing system 300. The instructions may include server applications, an authentication application, network communication processes, and other types of application or software. Memory 312 may be a volatile or non-volatile, magnetic, semiconductor, tape, optical, removable, non-removable, or other type of storage device or tangible (i.e., non-transitory) computer-readable medium.

Figure 4:
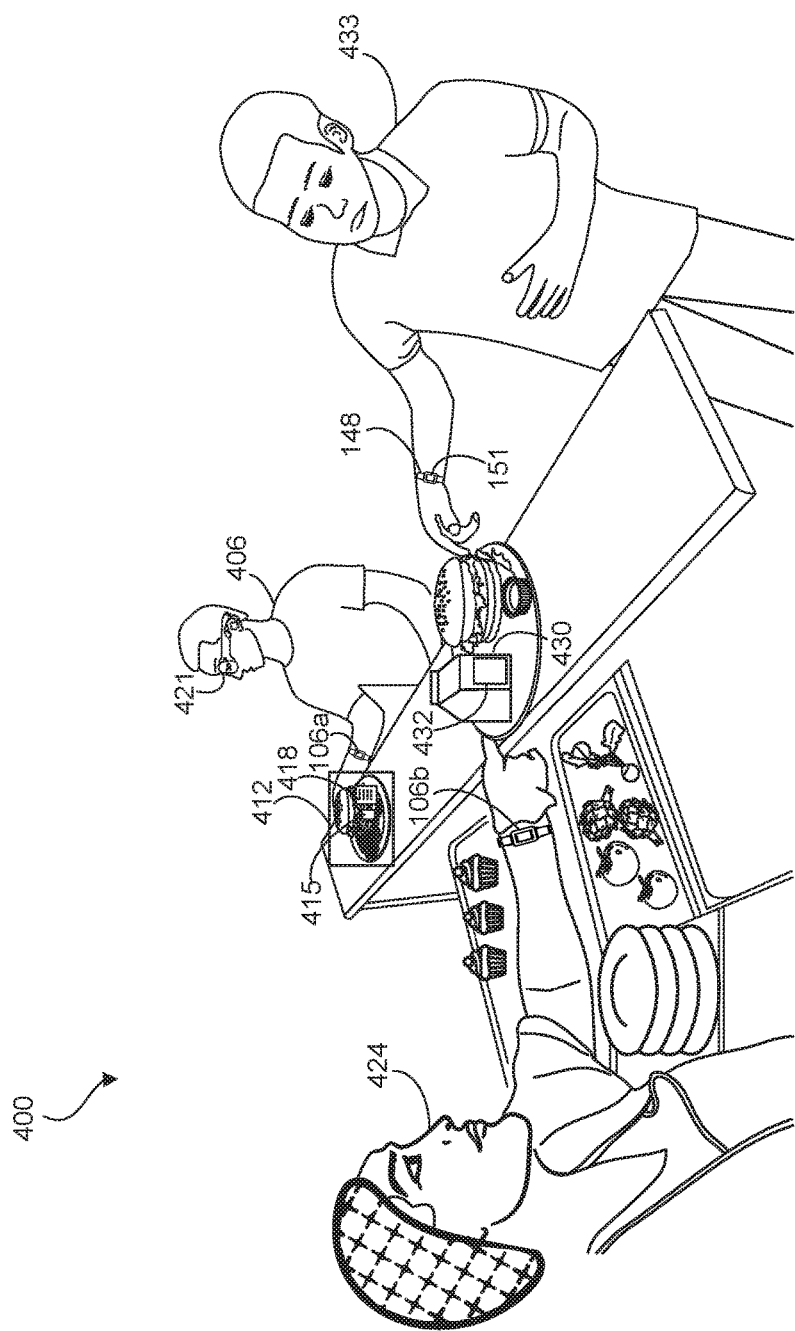
FIGS. 4 and 5 illustrate environments within which the exemplary system for sensing and indicating proximity of an article with a specific characteristic of FIG. 1 may operate.

FIG. 4 shows an exemplary environment 400 within which an exemplary implementation of wearable device 106 may operate.

As shown in FIG. 4, a user 406 wears a wearable device, such as a smartwatch 106a. Smartwatch 106a is an exemplary implementation of wearable device 106. In some embodiments, the wearable device may be a different type of device worn on the wrist. As user 406 reaches for a food container 412, smartwatch 106a may use an RFID reader or other sensor to detect an information source in the form of an RFID tag 415 on food container 412. This may occur when RFID tag 415 and food container 412 are within a predetermined distance from smartwatch 106a. For example, smartwatch 106a may detect RFID tag 415 when they are within one foot of each other. In some embodiments, smartwatch 106a may detect RFID tag 415 when they are at different distance from each other, as described above with respect to FIG. 1.

Upon detecting RFID tag 415, smartwatch 106a may detect characteristic information from RFID tag 415 by reading RFID tag 415. The characteristic information may be an ingredient list for food within food container 412. Smartwatch 106a may have access to predefined characteristic information associated with user 406. For example, the predefined characteristic information may be a list of ingredients to which user 406 is allergic or otherwise wants to avoid (e.g., for religious reasons).

Smartwatch 106a may have the predefined characteristic information stored in internal memory continuously or smartwatch 106a may request the information from server 145 (FIG. 1) when it detects particular characteristic information from RFID tag 415. For example, smartwatch 106a may request a dynamically updated allergy list or other nutritional requirements (e.g., a maximum number of calories) from server 145 when it detects characteristic information such as, for example, an ingredient list or nutritional information for a food product.

Smartwatch 106a may compare the predefined characteristic information with the detected characteristic information. In the present example, smartwatch 106a may compare predefined characteristic information in the form of a list of ingredients to which user 406 is allergic, with the detected characteristic information in the form of a list of ingredients detected from RFID tag 415. If there is a match, an indicator in smartwatch 106a may generate an alarm in the form of, for example, a vibration, sound, and/or display to alert user 406 to the fact that they are within a predetermined distance of an article containing an ingredient the user is allergic to.

User 406 may have a wearable device that is a set of smart glasses 421 instead of or in addition to smartwatch 106a. Smart glasses 421 may detect articles that are within a predetermined distance of the smart glasses 421 or at any distance from smart glasses 421.

Smart glasses 421 may operate in a manner similar to smartwatch 106a. Instead or in addition, smart glasses 106a may include an imaging device to detect an information source such as a label 418, a barcode (not shown), and/or a QR code (not shown). Label 418 may contain characteristic information such as a list of ingredients for food in food container 412. Smart glasses 421 may use, for example, a standard optical character recognition system to process the detected label 418. Smart glasses 421 may use this detected characteristic information as described above with respect to the smartwatch.

In some embodiments, smart glasses 421 may use two or more sensors to detect an article with two or more information sources. For example, smart glasses 421 may use an RFID reader to detect RFID tag 415 and an imaging device to detect label 418. Smart glasses 421 may select the characteristic information to compare to the predefined characteristic information. For example, smart glasses 421 may select characteristic information obtained from RFID tag 415 or the characteristic information obtained from label 418. In some embodiments, smart glasses 421 may select the more reliable characteristic information. For example, smart glasses 421 may default to using characteristic information detected by an RFID reader instead of an imaging device. In some embodiments, where smart glasses 421 use one or more imaging devices to detect the shape of food container 412 and detect label 418, smart glasses 421 may select which of these two sources of characteristic information to rely on. In this context, the shape of food container 412 is the information source and food container 412 is the article. Smart glasses 421 may identify the food product based on the detected shape of the food container. In this context, the identified food product is the detected characteristic information. Which of the two sources of characteristic information smart glasses 421 rely on may depend on, for example, the quality of text on label 418 and/or the uniqueness of the shape of container 412. If the quality of text on label 418 is poor, smart glasses 421 may use characteristic information detected from the shape of food container 412. Otherwise, smart glasses 421 may use characteristic information detected from label 418.

As further shown in FIG. 4, in some embodiments, a user 424 wears wearable device 106b and serves a food product 430 to a student 433. Food product 430 may be, for example, a box of milk. Food product 430 has an RFID tag 432 affixed to it. Student 433 wears wristband 148 that includes RFID tag 151 (FIG. 1), or other technology or information source (e.g., barcode) for relaying information to wearable device 106b. Wearable device 106b may detect characteristic information from RFID tag 432 on food product 430 and characteristic information from RFID tag 151 on wristband 148 on student 433. For example, characteristic information from RFID tag 432 may indicate that lactose is an ingredient in food product 430. Characteristic information from RFID tag 151 may indicate the name of student 433. Wearable device 106b may transmit the name of student 433 to server 145 (FIG. 1) and receive predefined characteristic information associated with student 433 from server 145 or another source. The predefined characteristic information associated with student 433 may list lactose as an ingredient student 433 has an intolerance towards. Comparing the characteristic information detected from RFID tag 432 and the predefined characteristic information and detecting a match, wearable device 106b may generate an alert to notify user 424 that they are serving a food product to which student 433 has an intolerance. In some embodiments, the comparison may be performed on server 145 and the results transmitted to wearable device 106b.

A similar system may be used for administering prescribed medication. When administering a medicine, a healthcare provider may wear wearable device 106b. Wearable device 106b may detect characteristic information identifying student 433 or a patient wearing wristband 148 and request predefined characteristic information indicating the medicine student 433 was prescribed or other information (e.g., the dosage of the medicine prescribed). Once the predefined characteristic information is received by wearable device 106, wearable device 106 may compare the predefined characteristic information and the identifier of the medicine being administered (e.g., received from an RFID tag on the medicine). In some embodiments, this comparison may be performed by server 145 (FIG. 1). If wearable device 106b or server 145 determines that there is a mismatch between the predefined characteristic information and the identifier of the medicine being administered, wearable device 106b may generate an alert to notify user 424 that they are administering a medicine that was not prescribed to the patient. In some embodiments, wristband 148 may transmit predefined characteristic information instead of or in addition to characteristic information. In some embodiments, a healthcare provider may wear smart glasses 421 that may use sensors for facial recognition instead or in addition to other methods of detection to identify a patient.

Figure 5:
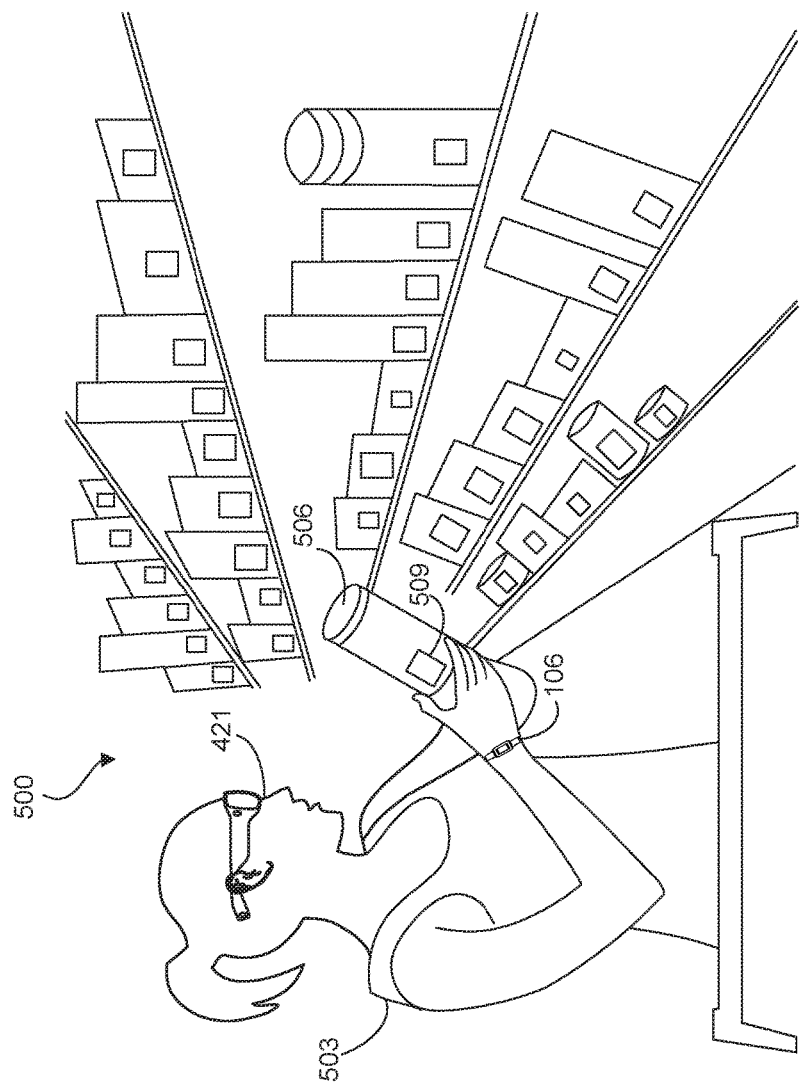

FIG. 5 shows another exemplary environment 500 within which an exemplary implementation of wearable device 106 may operate.

As shown in FIG. 5, a user 503 wears a wearable device, such as smartwatch 106. In some embodiments, the wearable device may be a different type of device worn on the wrist. As user 503 reaches for a food product 506, smartwatch 106 may use an RFID reader or other sensor to detect an information source, such as an RFID tag 509, on or from food product 506. This may occur when RFID tag 509 and food container 506 are within a predetermined distance from smartwatch 106. For example, smartwatch 106 may detect RFID tag 509 when they are within one foot of each other.

Upon detecting RFID tag 509, smartwatch 106 may detect characteristic information from RFID tag 509 by, for example, reading RFID tag 509. The characteristic information may be an ingredient list for food within food container 506. Smartwatch 106 may have access to predefined characteristic information associated with user 503. For example, the predefined characteristic information may be a maximum number of calories that user 503 wants to limit their consumption to for the rest of the day, or other nutritional information (e.g., a maximum amount of a nutritional component, such as cholesterol, that user 503 wants to limit their consumption to for the remainder of the day). Smartwatch 106 may then compare the predefined characteristic information with the detected characteristic information to determine whether to generate an alert. In some embodiments, the comparison may be performed by server 145 (FIG. 1). If the comparison determines that user 503 is holding an item with, for example, more calories than the maximum number identified by the predefined characteristic information, smartwatch 106 may generate an alarm. The predefined characteristic information may be updated dynamically based on information obtained from user 503 or other devices. For example, user 503 may enter the number of calories consumed during the day or other nutritional information into an application for tracking food intake. The predefined characteristic information may be updated accordingly.

The wearable device worn by user 503 may be smart glasses 421. Smart glasses 421 may operate in this context in a manner similar to that described with respect to FIG. 4 and above with respect to smartwatches 106a and/or 106b. For example, smart glasses 421 may rely on multiple sensors to decide which detected characteristic information to compare to the predetermined characteristic information.

Figure 6:
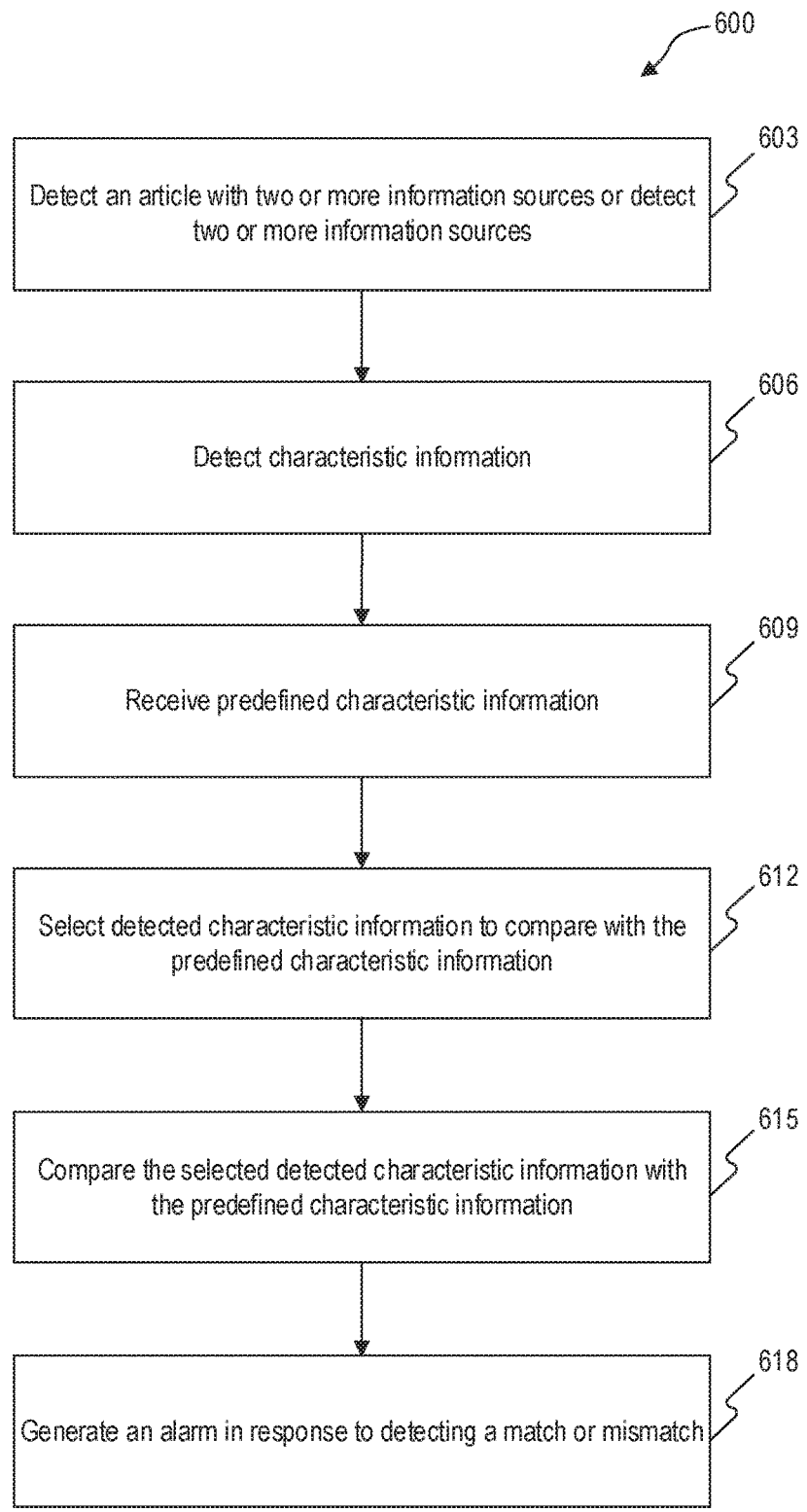
FIG. 6 is a flow chart illustrating an exemplary method for sensing and indicating proximity of an article with a specific characteristic.

FIG. 6 is a flow chart illustrating an exemplary method 600 for sensing and indicating proximity of an article with a specific characteristic. Method 600 includes detecting, e.g., with wearable device 106, an article (e.g., article 109) with two or more information sources, such as RFID tag 112 and label 115, or detecting the two or more information sources (step 603). In some embodiments, method 600 may include detecting an article with one information source. In some embodiments, information sources may be associated with one or more articles. In some embodiments, information sources may not be associated with one or more articles. Method 600 further includes detecting, e.g., with wearable device 106, characteristic information (step 606). Method 600 may include receiving predefined characteristic information (step 609). The predefined characteristic information may be received by, for example, wearable device 106 and/or server 145. Method 600 may include selecting detected characteristic information to compare with the predefined characteristic information (step 612). The selection may be made by, for example, wearable device 106 and/or server 145. Method 600 may include comparing the selected detected characteristic information with the predefined characteristic information (step 615), and generating an alarm in response to detecting a match or mismatch (step 618). The comparison and/or generation of the alarm may be performed by, for example, wearable device 106 and/or server 145. In some embodiments, an alarm may be generated if the comparison reveals a different result, such as if a value specified by the characteristic information exceeds a value specified by the predefined characteristic information.

It may be desirable to accurately detect the presence of an article the user wants to avoid. Current systems are limited in their ability to determine which piece of information associated with an article to rely on when determining the presence of an article of interest. Further, the article or articles a person may want to avoid may change over time. Current systems, however, are limited in their ability to accurately determine which article or articles a user wants to avoid at a particular time. Additionally, current systems do not use characteristic information detected from an information sources to retrieve predefined characteristic data for comparing with characteristic information detected from another information source and determine whether to generate an alarm based on the comparison results. It is also desirable to improve the accuracy with which current systems detect the presence of articles of interest.

Some embodiments consistent with the present disclosure overcome at least some of these limitations. For example, wearable device 106 or server 145 may select detected characteristic information from at least two information sources to compare with predefined characteristic information. Doing so permits wearable device 106 or server 145 to select the most reliable characteristic information for sensing an article with a specific characteristic, improving the detection accuracy over current systems. Further, wearable device 106 may receive predefined characteristic information from server 145 and/or the predefined characteristic information may be dynamically updated. This may ensure that an alarm is generated based on the latest and most accurate data available (e.g., updated nutritional information). Similarly, wearable device 106 may have two or more sensors of different types (e.g., RFID reader and image sensor) for detecting one or more information sources. This may improve the accuracy with which articles are identified. Wearable device 106 and/or server 145 may use characteristic information detected from an information source to retrieve predefined characteristic data and compare the predefined characteristic information with characteristic information detected from another information source. The results of this comparison may be used by wearable device 106 and/or server 145 to determine whether to generate an alarm based on the comparison results. This may permit only one or a few smartwatches 106 to be used in a system environment to detect the proximity of, for example, a medicine and a patient to whom the medicine was not prescribed. For example, many patients in a hospital setting may require wristbands 145 whereas only a few nurses may have a wearable device 106. Because wearable device 106 may be more expensive than wristband 145, embodiments consistent with the present disclosure may reduce the cost of creating the system environment as compared to system environments incorporating current systems requiring that each patient have a smart wearable device.

Consistent with disclosed embodiments, there is provided a condition-responsive wearable device for sensing and indicating proximity of an article with a specific characteristic, the wearable device comprising: a processor; a sensor, wherein the sensor is configured to: detect an article with two or more information sources within a predetermined distance of the sensor, wherein the information sources contain characteristic information of the article, and detect the characteristic information from at least one of the information sources; a memory storing instructions that, when executed by the processor, cause the processor to: receive predefined characteristic information, select detected characteristic information from at least two of the information sources to compare with the predefined characteristic information, and compare the selected detected characteristic information with the predefined characteristic information; and an indicator configured to generate an alarm in response to the processor detecting a match between the selected detected characteristic information and the predefined characteristic information. In some embodiments, the predefined characteristic information is received from a remote server. In some embodiments, the wearable device further comprises an antenna configured to receive the predefined characteristic information transmitted from the remote server. In some embodiments, the article is a medicine; the predefined characteristic information comprises an identification of a medicine prescribed to a user; and the characteristic information comprises an identification of the article. In some embodiments, the predefined characteristic information comprises a list of one or more ingredients harmful to a user and the characteristic information comprises a list of one or more ingredients of the article. In some embodiments, the alarm is a haptic signal. In some embodiments, the sensor comprises an imaging device. In some embodiments, the sensor comprises at least one of a Quick Response Code reader, a barcode reader, a camera, or a Radio-frequency Identification (RFID) reader. In some embodiments, at least one of the information sources comprises an RFID tag. In some embodiments, at least one of the information sources comprises a label on the article. In some embodiments, at least one of the information sources comprises a shape of the article. In some embodiments, the sensor is capable of detecting characteristic information using optical character recognition. In some embodiments, the selected detected characteristic information is an ingredient list and the ingredient list is detected by the sensor and processed using optical character recognition. In some embodiments, the predefined characteristic information is dynamically updated nutritional information. In some embodiments, the predefined characteristic information is dynamically updated medical information. In some embodiments, the article holds sub-articles and the characteristic information comprises characteristic information for at least a plurality of the sub-articles. In some embodiments, the article is a medicine container. In some embodiments, the article is a food-product container.

Consistent with disclosed embodiments, there is provided a condition-responsive wearable device for sensing and indicating proximity of an information source associated with an article with a specific characteristic, the wearable device comprising: a processor; two or more sensors of different types, wherein each sensor is configured to: detect one or more information sources associated with an article within a predetermined distance of the sensor, wherein the information sources contain characteristic information of the article, and detect the characteristic information from at least one of the information sources; a memory storing instructions that, when executed by the processor, cause the processor to: receive predefined characteristic information, select detected characteristic information from at least two of the information sources to compare with the predefined characteristic information, and compare the selected detected characteristic information with the predefined characteristic information; and an indicator configured to generate an alarm in response to the processor detecting a match between the selected detected characteristic information and the predefined characteristic information.

Consistent with disclosed embodiments, there is provided a non-transitory computer-readable medium storing a set of instructions that are executed by at least one processor to perform a method for sensing and indicating proximity of an article with a specific characteristic, the method comprising: receiving characteristic information of an article detected by a wearable device's sensor from at least one information source, wherein at least two information sources contain characteristic information of the article; receiving predefined characteristic information; selecting detected characteristic information from at least two of the information sources to compare with the predefined characteristic information; comparing the selected detected characteristic information with the predefined characteristic information; and detecting a match between the selected detected characteristic information and the predefined characteristic information.

Consistent with disclosed embodiments, there is provided a condition-responsive wearable device for sensing and indicating proximity of an article with a specific characteristic, the wearable device comprising: a processor; a sensor, wherein the sensor is configured to: detect an article with a first information source within a first predetermined distance of the sensor, wherein the first information source includes characteristic information of the article, detect the characteristic information of the article from the first information source, detect a user with a second information source within a second predetermined distance of the sensor, wherein the second information source includes characteristic information of the user, and detect the characteristic information of the user from the second information source; a memory storing instructions that, when executed by the processor, cause the processor to: request predefined characteristic information associated with the user based on the detected characteristic information of the user; receive the predefined characteristic information, and compare the characteristic information of the article with the predefined characteristic information; and an indicator configured to generate an alarm in response to the processor detecting a mismatch between the characteristic information of the article and the predefined characteristic information. In some embodiments, the predefined characteristic information is received from a remote server. In some embodiments, the wearable device further comprises an antenna configured to receive the predefined characteristic information transmitted from the remote server. In some embodiments, the article is a medicine; the predefined characteristic information comprises an identification of a medicine prescribed to the user; and the characteristic information of the article comprises an identification of the article. In some embodiments, the predefined characteristic information comprises a dosage of a medicine prescribed to the user and the characteristic information of the article comprises a dosage of the article. In some embodiments, the alarm is a haptic signal. In some embodiments, the sensor comprises an imaging device. In some embodiments, the sensor comprises at least one of a Quick Response Code reader, a barcode reader, a camera, or a Radio-frequency Identification (RFID) reader. In some embodiments, at least one of the information sources comprises an RFID tag. In some embodiments, at least one of the information sources comprises a label. In some embodiments, at least one of the information sources comprises a shape. In some embodiments, the sensor is capable of detecting at least one of the characteristic information of the article or the characteristic information of the user using at least one of optical character recognition or facial recognition. In some embodiments, the detected characteristic information of the user is an identifier detected by the sensor and processed using at least one of optical character recognition or facial recognition. In some embodiments, the predefined characteristic information is dynamically updated nutritional information. In some embodiments, the predefined characteristic information is dynamically updated medical information. In some embodiments, the article holds sub-articles and the characteristic information of the article comprises characteristic information for at least a plurality of the sub-articles. In some embodiments, the article is a medicine container. In some embodiments, the article is a food-product container.

Consistent with disclosed embodiments, there is provided a condition-responsive wearable device for sensing and indicating proximity of an information source associated with an article with a specific characteristic, the wearable device comprising: a processor; two or more sensors of different types, wherein each sensor is configured to: detect one or more first information sources associated with an article within a first predetermined distance of the sensor, wherein the one or more first information sources include characteristic information of the article, and detect the characteristic information of the article from the one or more first information sources; a memory storing instructions that, when executed by the processor, cause the processor to: receive characteristic information of a user, request predefined characteristic information associated with the user based on the received characteristic information of the user; receive the predefined characteristic, select detected characteristic information of the article from at least two of the information sources to compare with the predefined characteristic information, and compare the selected detected characteristic information with the predefined characteristic information; and an indicator configured to generate an alarm in response to the processor detecting a mismatch between the selected detected characteristic information and the predefined characteristic information.

Consistent with disclosed embodiments, there is provided a non-transitory computer-readable medium storing a set of instructions that are executed by at least one processor to perform a method for sensing and indicating proximity of an article with a specific characteristic, the method comprising: receiving characteristic information of an article detected by at least one sensor on a wearable device from at least one first information source; receiving characteristic information of a user detected by at least one sensor on a wearable device from at least one second information source; requesting predefined characteristic information associated with the user based on the received characteristic information of the user; receiving the predefined characteristic information; comparing the characteristic information of the article with the predefined characteristic information; and detecting a mismatch between the characteristic information of the article and the predefined characteristic information.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java™ (see https://docs.oracle.com/javase/8/docs/technotes/guides/language/), C, C++, assembly language, or any such programming languages. One or more of such software sections or modules can be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A condition-responsive wearable device for sensing and indicating proximity of an article with a specific characteristic, the wearable device comprising:
    a processor;
    a sensor, wherein the sensor is configured to:
        detect an article with two or more information sources within a predetermined distance of the sensor, wherein the information sources contain characteristic information of the article, and
        detect the characteristic information from at least one of the information sources;
    a memory storing instructions that, when executed by the processor, cause the processor to:
        receive predefined characteristic information,
        select detected characteristic information from at least two of the information sources to compare with the predefined characteristic information, and
        compare the selected detected characteristic information with the predefined characteristic information; and
    an indicator configured to generate an alarm in response to the processor detecting a match between the selected detected characteristic information and the predefined characteristic information.

2. The wearable device of claim 1, wherein the predefined characteristic information is received from a remote server.

3. The wearable device of claim 2, further comprising an antenna configured to receive the predefined characteristic information transmitted from the remote server.

4. The wearable device of claim 1, wherein:
    the article is a medicine;
    the predefined characteristic information comprises an identification of a medicine prescribed to a user; and
    the characteristic information comprises an identification of the article.

5. The wearable device of claim 1, wherein the predefined characteristic information comprises a list of one or more ingredients harmful to a user and the characteristic information comprises a list of one or more ingredients of the article.

6. The wearable device of claim 1, wherein the alarm is a haptic signal.

7. The wearable device of claim 1, wherein the sensor comprises an imaging device.

8. The wearable device of claim 1, wherein the sensor comprises at least one of a Quick Response Code reader, a barcode reader, a camera, or a Radio-frequency Identification (RFID) reader.

9. The wearable device of claim 1, wherein at least one of the information sources comprises an RFID tag.

10. The wearable device of claim 1, wherein at least one of the information sources comprises a label on the article.

11. The wearable device of claim 1, wherein at least one of the information sources comprises a shape of the article.

12. The wearable device of claim 1, wherein the sensor is capable of detecting characteristic information using optical character recognition.

13. The wearable device of claim 12, wherein the selected detected characteristic information is an ingredient list and the ingredient list is detected by the sensor and processed using optical character recognition.

14. The wearable device of claim 1, wherein the predefined characteristic information is dynamically updated nutritional information.

15. The wearable device of claim 1, wherein the predefined characteristic information is dynamically updated medical information.

16. The wearable device of claim 1, wherein the article holds sub-articles and wherein the characteristic information comprises characteristic information for at least a plurality of the sub-articles.

17. The wearable device of claim 1, wherein the article is a medicine container.

18. The wearable device of claim 1, wherein the article is a food-product container.

19. A condition-responsive wearable device for sensing and indicating proximity of an information source associated with an article with a specific characteristic, the wearable device comprising:
    a processor;

two or more sensors of different types, wherein each sensor is configured to:
  detect one or more information sources associated with an article within a predetermined distance of the sensor, wherein the information sources contain characteristic information of the article, and
  detect the characteristic information from at least one of the information sources;
a memory storing instructions that, when executed by the processor, cause the processor to:
  receive predefined characteristic information,
  select detected characteristic information from at least two of the information sources to compare with the predefined characteristic information, and
  compare the selected detected characteristic information with the predefined characteristic information; and
an indicator configured to generate an alarm in response to the processor detecting a match between the selected detected characteristic information and the predefined characteristic information.

20. A non-transitory computer-readable medium storing a set of instructions that are executed by at least one processor to perform a method for sensing and indicating proximity of an article with a specific characteristic, the method comprising:
  receiving characteristic information of an article detected by a wearable device's sensor from at least one information source, wherein at least two information sources contain characteristic information of the article;
  receiving predefined characteristic information;
  selecting detected characteristic information from at least two of the information sources to compare with the predefined characteristic information;
  comparing the selected detected characteristic information with the predefined characteristic information; and
  detecting a match between the selected detected characteristic information and the predefined characteristic information.

* * * * *